(12) United States Patent
Pularikkal et al.

(10) Patent No.: US 8,937,927 B1
(45) Date of Patent: Jan. 20, 2015

(54) SEAMLESS MOBILITY HANDOVER

(71) Applicant: Cisco Technology, Inc., San Jose, CA (US)

(72) Inventors: Gangadharan Byju Pularikkal, Milpitas, CA (US); Madhusudan Nanjanagud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/045,013

(22) Filed: Oct. 3, 2013

(51) Int. Cl.
*H04W 4/00* (2009.01)
*H04W 36/18* (2009.01)
*H04W 36/36* (2009.01)

(52) U.S. Cl.
CPC ............. *H04W 36/18* (2013.01); *H04W 36/36* (2013.01)
USPC .......................................... 370/331; 370/349

(58) Field of Classification Search
CPC ......... H04L 2012/5608; H04W 84/12; H04W 88/08; H04W 80/04; H04W 88/06; H04W 84/18; H04W 8/26
USPC ................................. 370/310.2, 328, 338, 349
See application file for complete search history.

(56) References Cited

U.S. PATENT DOCUMENTS

| | | | |
|---|---|---|---|
| 8,675,551 B2 * | 3/2014 | Xia et al. | 370/328 |
| 2009/0122750 A1 * | 5/2009 | Sarikaya | 370/328 |
| 2012/0005372 A1 * | 1/2012 | Sarikaya et al. | 709/245 |

* cited by examiner

*Primary Examiner* — Brenda H Pham
(74) *Attorney, Agent, or Firm* — Merchant & Gould

(57) ABSTRACT

Seamless mobility between public and private WLANs may be provided. First a Mobile Node (MN) may be registered for privileged network access via a first access point (AP). Then, a privileged access channel for the MN via a first Mobility Access Gateway (MAG) may be established. Next, a switch by the MN from the first AP to a second AP may be detected. A determination may be made as to whether the second AP is associated with one of the following: the first MAG and a second MAG. Then, when the second AP is associated with the first MAG, the second AP may be established as a new termination point for the privileged access channel. When the second AP is associated with the second MAG, a new privileged access channel may be established through the second MAG.

18 Claims, 5 Drawing Sheets

US 8,937,927 B1

SEAMLESS MOBILITY HANDOVER

TECHNICAL FIELD OF DISCLOSURE

The present disclosure relates to mobile device connectivity in a telecommunications network.

BACKGROUND

Residential Broadband customers predominately use a private wireless local area network (WLAN) in their home. Multiple mobile nodes, such as, laptops, tablets, and smartphones, may be connected to the private WLAN on the customer's premises. The mobile connectivity of the nodes allows the customer to stay connected to the private WLAN while roaming within a signal range of the WLAN.

Certain telecommunications service providers also authorize their customers to use a public WLAN provided by the service provider. In these cases, when the customer's mobile node roams outside of the signal range of the private WLAN, the mobile node may detect and connect to the public WLAN provided by the service provider. Conventional systems, however, do not support a seamless transition between the private WLAN and the public WLAN. Consequently, the customer may experience a transient interruption of service during the mobile node's switch from the private WLAN to the public WLAN, and vice versa.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Figure 1:
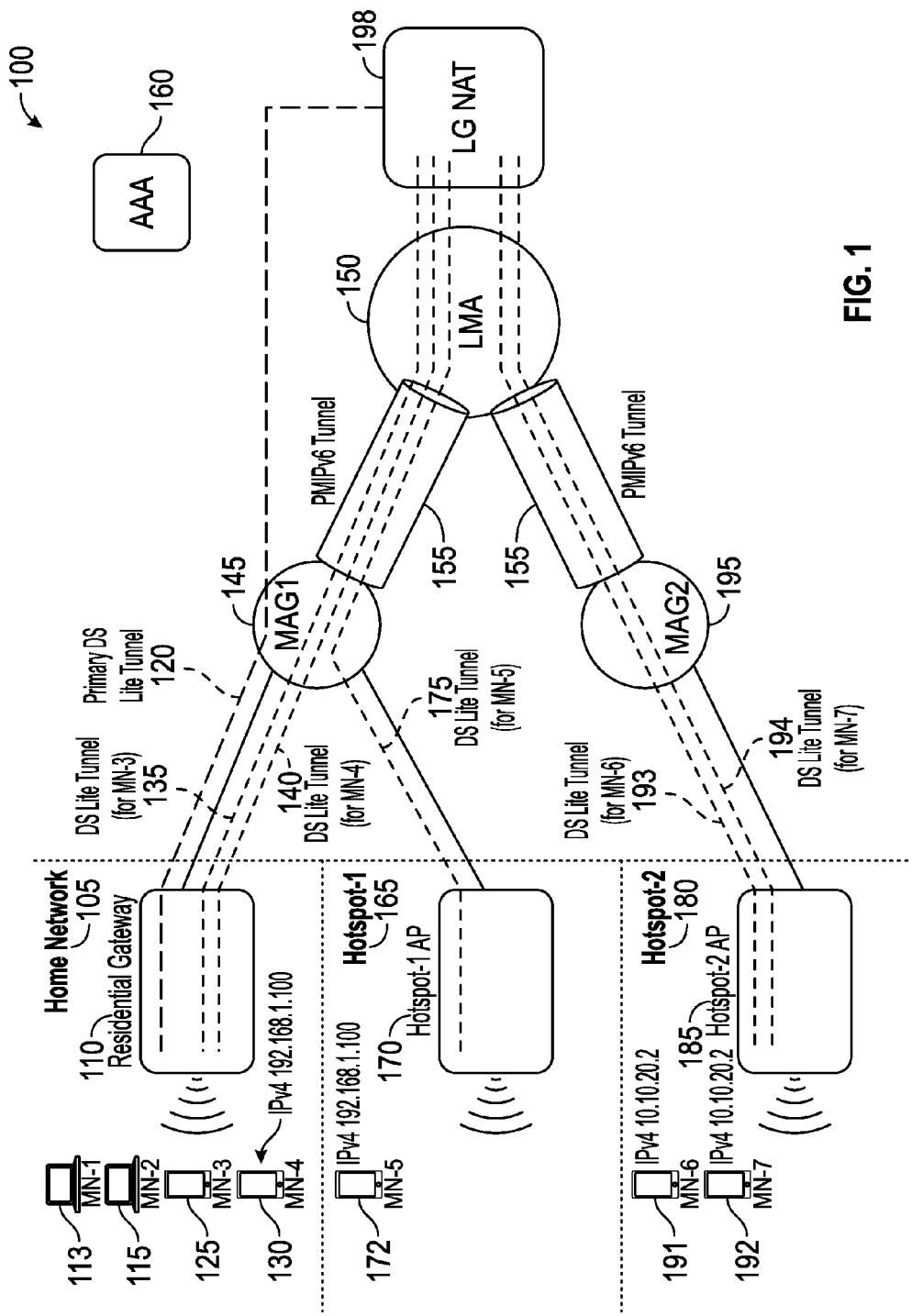
FIG. 1 is a diagram illustrating an embodiment of a network architecture for providing seamless mobility handover.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Overview

Seamless mobility between public and private WLANs may be provided. First a Mobile Node (MN) may be registered for privileged network access via a first access point (AP). Then, a privileged access channel for the MN via a first Mobility Access Gateway (MAG) may be established. Next, a switch by the MN from the first AP to a second AP may be detected. A determination may be made as to whether the second AP is associated with one of the following: the first MAG and a second MAG. Then, when the second AP is associated with the first MAG, the second AP may be established as a new termination point for the privileged access channel. When the second AP is associated with the second MAG, establishing a new privileged access channel through the second MAG. When the second AP is associated with the second MAG, a new privileged access channel may be established through the second MAG.

Example Embodiments

Embodiments of the present disclosure provide seamless mobility between public and private WLANs. Seamless mobility between public and private WLANs may improve the customers' experience during roaming with their mobile nodes. For instance, a seamless handover between private and public WLANs may help ensure that calls managed by Voice-Over-Wi-Fi applications don't noticeably interrupt when the customer leaves the signal range of the private WLAN (e.g., private SSID) and enters the signal range of the public WLAN (e.g., public SSID). Similarly, a customer's downloading of content to the mobile node over, for example, the private WLAN, may not noticeably interrupt as the mobile node switches to the public WLAN.

FIG. 1 illustrates an embodiment of a network architecture 100 for providing seamless mobility handover. Network architecture 100 may be hosted by, for example, a telecommunications service provider. The telecommunications service provider may provide its subscribers with access to a public network via, for example, residential gateways while the subscriber is at home and public Wi-Fi access points (APs) while the subscriber is outside of the home. The public Wi-Fi access areas may comprise one or more Wi-Fi APs. These Wi-Fi APs may be referred to as mobile "HotSpots" throughout this disclosure. In some embodiments, the HotSpots may be hosted by other service providers affiliated with the service provider of network 100.

Home network 105 may comprise a plurality of network devices, including, but not limited to, a mobile node (MN) such as a laptop, tablet, or other mobile telecommunication devices. A residential gateway (RG) 110 may connect the MN from home network 105 to the public network. For example, MNs 113 and 115 of home network 105 may connect to the public network via RG 110 and a Large-Scale Network Address Translator (LG NAT) 198. LG NAT 198 may serve to channel communications from the subscriber's network 100 to the public network.

Each of MNs 113, 115, 125, and 130 may comprise a first address type, such as, for example, an IPv4 address, which may be assigned by the RG 110. The first address type may be associated with a first communication protocol. The RG 110 and LG NAT 198 may communicate with each other over a primary Dual Stack (DS) Lite Tunnel 120, with the RG 110 serving as a first termination point of the DS Lite Tunnel 120 and the LG NAT 198 serving as the second termination point of DS Lite Tunnel 120. A second address type, such as, for example, an IPv6 address, may be used to tunnel network traffic having the first address type (i.e., IPv4 traffic) over DS Lite Tunnel 120. The second address type may be associated with a second communication protocol.

In this way, as conventional DS Lite tunneling mechanisms would allow, a first address type (i.e., an IPv4 address) may be used to interface MNs 113, 115, 125, and 130 with RG 110, while a second address type (i.e., the IPv6 address) may be used to interface the RG 110 with the LG NAT 198. LG NAT 198 may create a binding between the private IPv4 address of MNs 113, 115, 125, and 130 and a tunnel termination IPv6 address on the side of RG 110. LG NAT 198 may then map the IPv4 address to a public IPv4 address. Though embodiments of the present disclosure are disclosed with reference to an IPv4 address as the first address type and an IPv6 address as the second address type, other communication protocols may be used in addition to or in place of the address types.

Consistent with embodiments of the present disclosure, certain MNs may connect to network 100 with privileged access. Having privileged access, the MNs may be provided with connectivity to HotSpots (i.e., public Wi-Fi APs with, for example, EAS-SIM authentication) throughout the service provider's network 100. Embodiments of the present disclosure may enable the MNs to roam from one HotSpot to another and back to their home gateway without a noticeable interruption in service.

Figure 2:
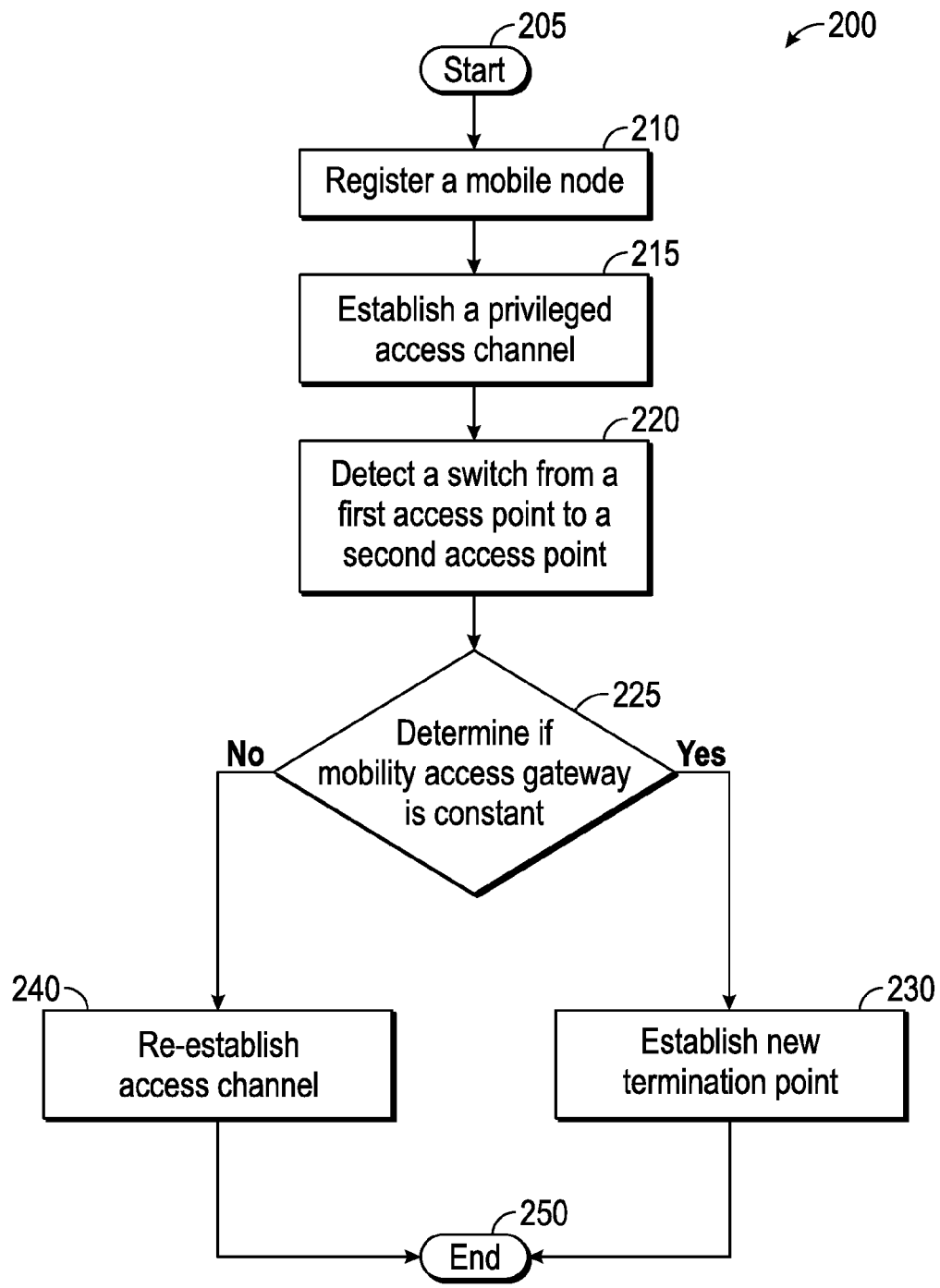
FIG. 2 is a flow chart of a method for providing seamless mobility handover.

FIG. 2 is a flow chart setting forth the general stages involved in a method 200 consistent with an embodiment of the disclosure for providing privileged access in network 100. Method 200 may be implemented within network 100 as described in more detail with reference to FIGS. 1 and 3-5. Ways to implement the stages of method 200 will be described in greater detail below.

Method 200 may begin at starting block 205 and proceed to stage 210 where network 100 may receive a registration for an MN for privileged network access. FIG. 1 illustrates MNs 125 and 130 connecting to network 100 with privileged access. To receive privileged network access, a subscriber to the service provider's network 100 may first register the MN for which privileged access is desired. In various embodiments, the subscriber may access a registration website with the MN. In this way, the MN's device credentials, such as, but not limited to, for example, the MN's MAC address, may be registered with the service provider.

During the registration process, RG 110 may be programmed to assign a particular IPv4 address for the registered MN. This IPv4 may then be tied to the MAC address of the registered MN and reserved exclusively for the registered MN. In this way, each time the registered MN connects to RG 110, it is provided with the same IPv4 address. In turn, this IPv4 address is tagged by RG 110 privileged access to network 100.

Having received the registration for the MN in stage 210, method 200 may advance to stage 215 where a privileged access channel for the registered MN may be established within network 100. RG 110 may provide the MN with privileged access by creating a specific DS Lite Tunnel for the MN. As illustrated in FIG. 1, privileged access MNs 125 and 130 each interface with network 100 via dedicated DS Lite Tunnels 135 and 140, respectively. In order to provide the registered MN with access to the dedicated DS Lite Tunnel, upon registration, RG 110 may disassociate the registered MN from primary DS Lite Tunnel 120 and then re-associate the registered MN to the corresponding dedicated DS Lite Tunnel providing the privileged access.

To create a dedicated DS Lite Tunnel for privileged access MNs, RG 110 may interface with a Mobility Access Gateway (MAG) 145. The service provider network 100 may comprise a plurality of MAGs, each of which may host a connection to various residential gateways and public Wi-Fi APs throughout network 100. RG 110 may connect to its corresponding MAG 145 and create a pseudo IPv6 attachment trigger on behalf of the connecting MN.

In various embodiments of the present disclosure, in response to the MN attachment trigger, MAG 145 may contact, for example, an Authentication, Authorization, and Accounting (AAA) server 160. AAA server 160 may comprise policy information associated with the subscriber of the registered MN. A check may be performed by AAA server 160 to see if the subscriber of the MN is registered to receive privileged access to network 100. AAA server 160 may respond to MAG 145 with a restriction or an authorization to provide the subscriber with privileged access.

Having the authorization from AAA 160, MAG 145 may then communicate the MAC address with a Local Mobile Anchor (LMA) 150. LMA 150 may associate the MAC address of the registered MN with an IPv6 address and store this information in a local cache. LMA issues the PBA in response to the PBU from the MAG corresponding to the MN. In order to complete the proxy IPv6 address assignment to RG 110 on behalf of the MN, MAG may implement either stateful DHCPv6 or stateless DHCPv6. A communications tunnel, such as, for example, a Proxy Mobile IPv6 (PMIPv6) tunnel 155 may then be created between MAG 145 and LMA 150. The IPv6 address may then be communicated to RG 110 where it is tied to the reserved IPv4 address of the MN.

As mentioned above, MNs may interface with RG 110 using an IPv4 address while an IPv6 address may be used as the tunnel termination point for the dedicated DS Lite Tunnel 135 on behalf of the MNs. Having the IPv6 address, RG 110 would then form the privileged access DS Lite Tunnel for the registered MN. In this way, the IPv6 address may remain constant as long as the newly connected to gateway or access point has a network path the LMA 150, even when the registered MN switches from RG 110 to another gateway or AP of network 100.

The privileged access DS Lite Tunnel may use the IPv6 address for all communications between its two termination points, RG 110 and LG NAT 198, while RG 110 may still interface with the registered MN using its assigned IPv4 address. In this way, any client-side applications operating on the registered MN may continue to operate with its assigned IPv4 address, while service provider network 100 interfaces with the registered MN via RG 110 using its assigned IPv6 address.

Having established the privileged access DS Lite Tunnel for the registered MN in stage 215, method 200 may advance to stage 220 where an indication that the registered MN has connected to a new network AP may be received. As mentioned above, the registered MN may receive the privilege of roaming from a private Wi-Fi network to a public Wi-Fi network, or from one public Wi-Fi network to another public Wi-Fi network. So long as the public Wi-Fi network is provided by the same service provider or affiliate thereof, privileged access status may provide subscribers and their corresponding MNs with continuous connectivity. However, to ensure that the continuous connectivity is provided seamlessly (i.e., without an interruption of service to the registered MNs during the switch from one AP to another AP), a proper mobility handover process may be in place.

Consistent with embodiments of the disclosure, in order to determine which mobility handover process to take, method 200 may proceed to decision block 225 where it determines which MAG is associated with the newly connected AP. As mentioned above, service provider's network 100 may comprise a plurality of MAGs, each hosting a plurality of different APs.

If it is determined that the newly connected AP is connected to the same MAG (i.e., MAG 145) as the previously connected AP (i.e., RG 110), method 200 may advance to stage 230 where the newly connected to AP is assigned as a new termination point for the privileged access DS Lite Tunnel dedicated to the registered MN.

Figure 3:
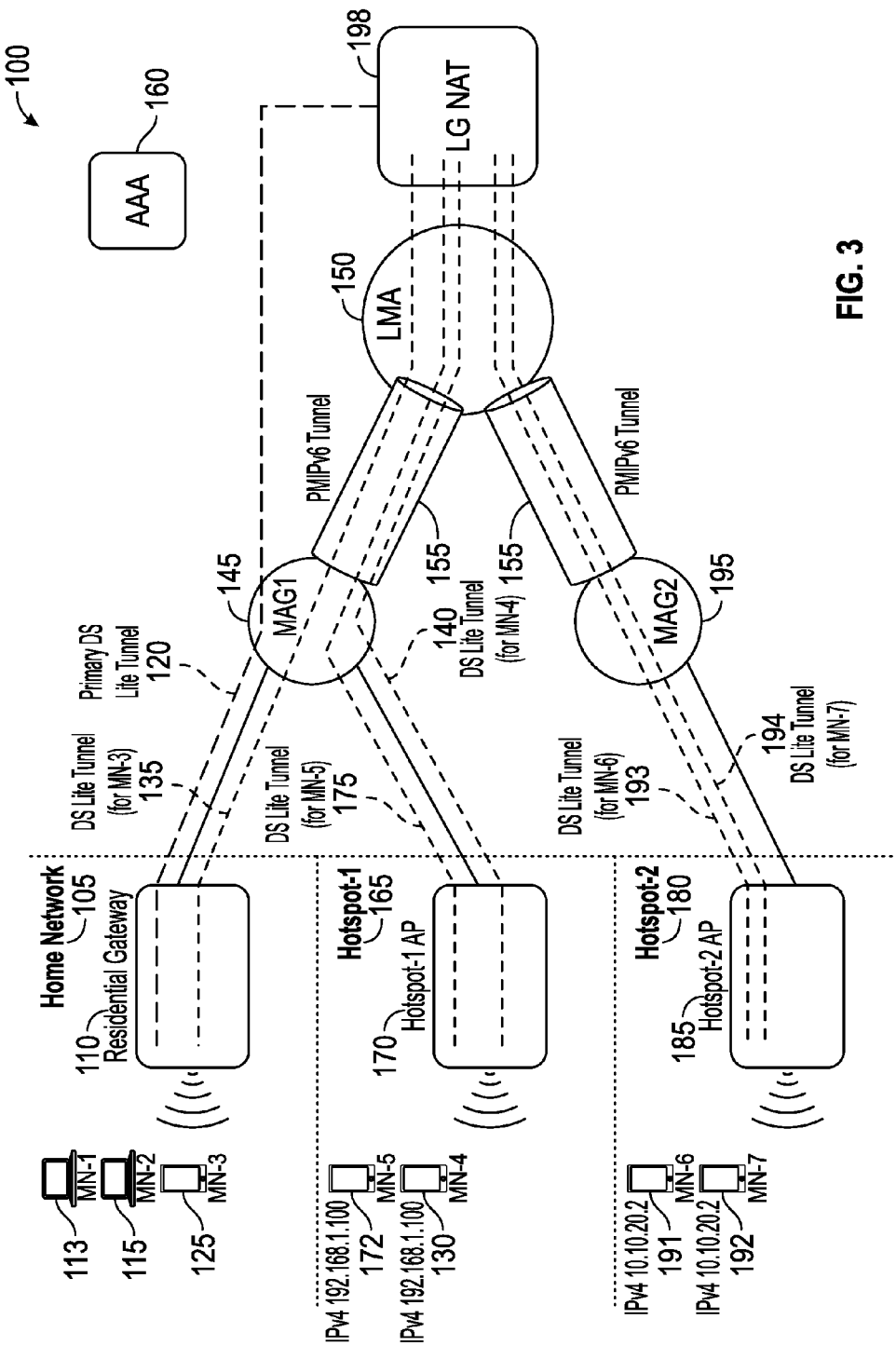
FIG. 3 is a diagram illustrating another embodiment of the network architecture for providing seamless mobility handover.

For example, and as illustrated in FIG. 3, MN 130 may have roamed from home network 105 hosted on RG 110 to a first HotSpot Network 165 hosted on a first HotSpot AP 170. AP 170 may already be hosting an MN 172 when it receives the new connection to MN 130. In certain scenarios, the earlier hosted MN (e.g., MN 172) may have been assigned the same IPv4 address the one assigned to MN 130 by RG 110. This may be a likely scenario as each AP is responsible for assigning its corresponding MNs with an IPv4 address. In turn, when the MN switches to a new AP, it may find that it's IPv4 address conflicts with another MN that established an earlier connection with the new AP.

To maintain a seamless connection for client-side activity on the newly connected MN, it may be necessary to preserve the MN's originally assigned IPv4 address, even when the initially assigned IPv4 address conflicts with the IPv4 address assigned to another MN hosted on the same AP. Such conflict, however, may only impact peer-to-peer (P2P) communication within the same AP. To solve the P2P connectivity issue that may be presented with overlapping IPv4 addresses, public Wi-Fi networks may simply disable P2P connectivity.

The overlapping MNs may not experience problems communicating with nodes outside of their AP as their IPv6 addresses (used to interface within network 100) may remain uniquely tied to their corresponding MAC addresses. For example, MN 172 may maintain its dedicated DS Lite Tunnel 175, which may be interfacing with LG NAT 198 using its uniquely assigned IPv6 address. Similarly, MN 130 may maintain its dedicated DS Lite tunnel 140, interfacing with LG NAT 198 using its uniquely assigned IPv6 address.

When the MN roams to a new AP, MAG 145 may detect that the MN is no longer connecting through its previously associated AP. In response, MAG 145 may then assign the new AP as the new termination point for dedicated DS Lite Tunnel responsible for providing the MN with privileged network access. The PMIPv6 Tunnel 155 and LG NAT 198 termination point of the dedicated DS Lite Tunnel remain constant. As neither the IPv4 nor IPv6 addresses of the MN have changed, no other modifications may need to be made within network 100 to preserve the network connectivity of the MN. In this way, the MN may seamlessly transition from one AP to another, so long as the MAG tied to each AP remains constant. Method 200 may then end at stage 250.

Figure 4:
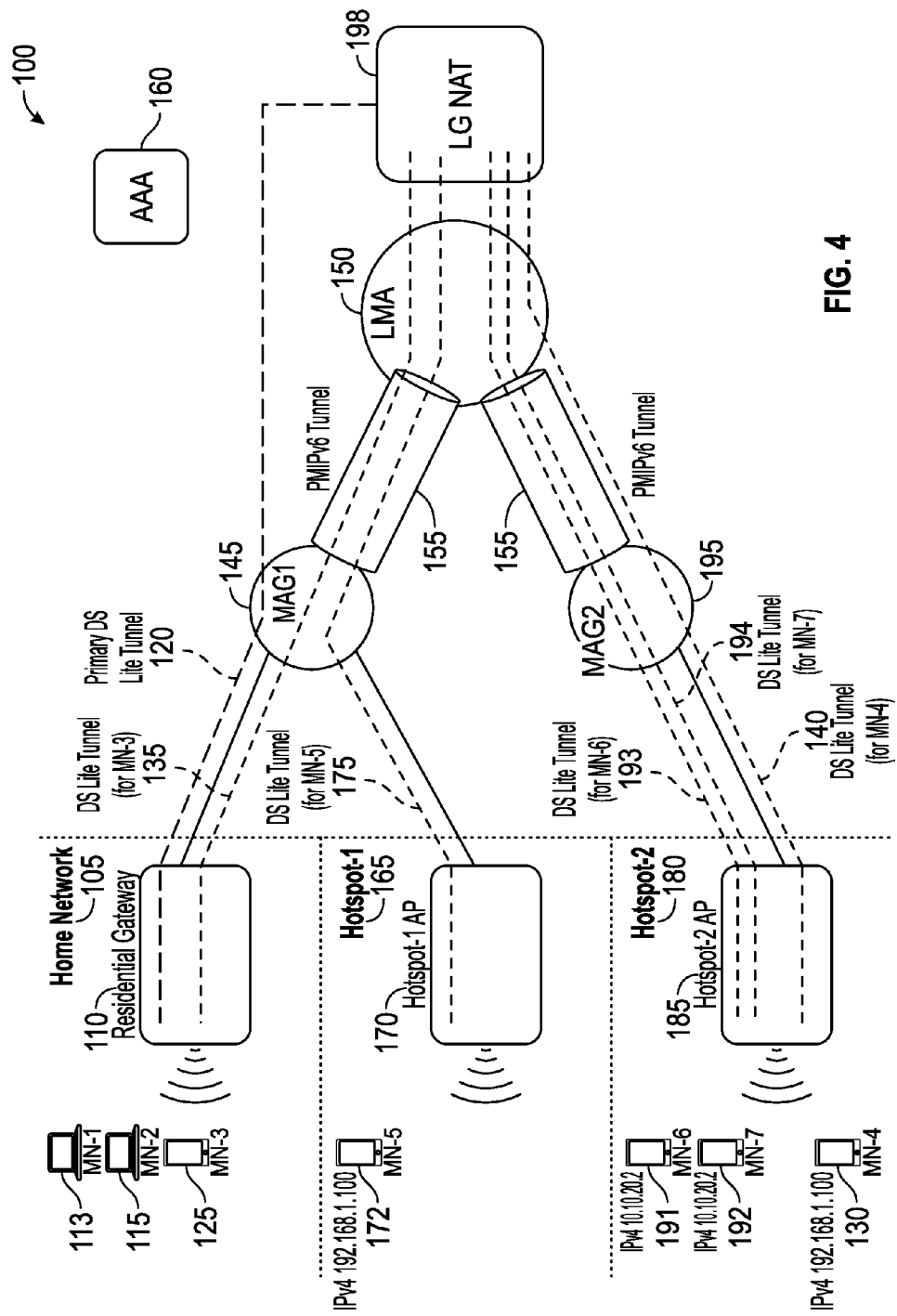
FIG. 4 is a diagram illustrating yet another embodiment of the network architecture for providing seamless mobility handover.

If it is determined that the newly connected AP is connected to the different MAG (i.e., MAG 195) than the previously connected AP (i.e., RG 110), method 200 may advance to stage 240 where a new DS Lite Tunnel is established. For example, and as illustrated in FIG. 4, MN 130 may have roamed from home network 105 hosted on RG 110 to a second HotSpot Network 180 hosted on a second HotSpot AP 185. Like first HotSpot AP 170, AP 185 may be hosting a plurality of MNs 191 and 192, each with their corresponding dedicated DS Lite Tunnels 193 and 194, respectively. In this scenario, however, AP 185 is not associated with the same MAG (i.e., MAG 145) that was used established the IPv6 address (and corresponding PMIPv6 Tunnel 155). As a result, newly associated MAG 195 may be required to reestablish the dedicated DS Lite Tunnel 140.

To reestablish the dedicated DS Lite Tunnel (e.g., DS Lite Tunnel 140) through MAG 195, MAG 195 may communicate to LMA 150 the MAC address of the newly connected MN (e.g., MN 130). LMA may then access its local cache to find which IPv6 address is associated with the newly connected MN. In turn, MAG 195 may receive the IPv6 address associated with the newly connected MN and reestablish the PMIPv6 Tunnel 155. Having reestablished the PMIPv6 Tunnel with MAG 195, LMA may signal MAG 145 to clear the previous PMIPv6 and DS Lite Tunnel sessions associated with the IPv6 address.

MAG 195 may then forward the IPv6 address of its newly connected MN to AP 185, which may serve as the new termination point of the reestablished DS Lite Tunnel. As neither the IPv4 nor IPv6 address has changed for the newly connected MN, connectivity may be continuously provided to client-side applications running on the newly connected MN. In this way, the MN may seamlessly transition from one AP to another, even when the MAG associated with the newly connected AP has changed. Method 200 may then end at stage 250.

In accordance with various embodiments of the present disclosure, when the MN roams back into the home private WLAN (e.g., private SSID), a client utility residing on the private WLAN may provide some indicator (e.g., a client-side pop up) when it is in quarantine mode. In quarantine mode, the MN may have external access and applications being accessed while on the public WLAN (e.g., public SSID) that should continue to work but may not be able to communicate with the local nodes in the home network. The quarantine mode may have been established to avoid peer-to-peer communication on public WLANs due to the IPv4 address conflicts mentioned above. One of the following triggers may make the MN exit the quarantine mode: 1) RG does an IPv4 address check and finds out that the mobile node address is the same as what is reserved in the local DHCP pool, and 2) the subscriber manually resets the quarantine mode and a DHCP discover goes out from the mobile node and it picks up the reserved address.

Figure 5:
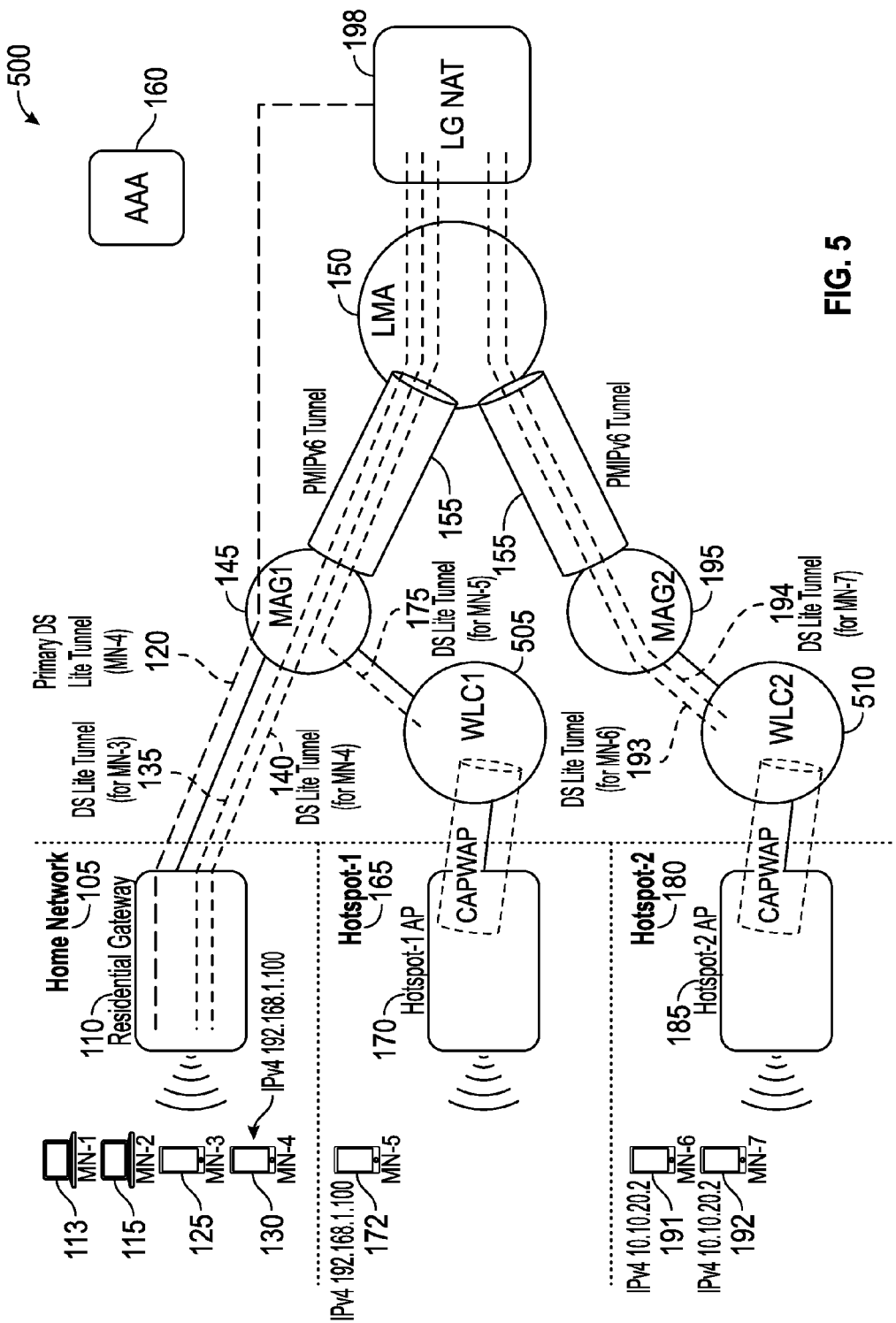
FIG. 5 is a diagram illustrating an embodiment of another network architecture for providing seamless mobility handover.

FIG. 5. Illustrates an embodiment of a network architecture 500 for providing seamless mobility handovers. Unlike the access points in network architecture 100, APs 165 and 185 of may not be autonomous. Rather, they may be controller based APs. Controller based APs may not be configured to directly interface with MAGs in the same way as autonomous APs. Rather, controller based APs 565 and 585 may interface, via a CAPWAP protocol, with Wireless LAN Controllers (WLC) 505 and 510, respectively. In this scenario, the operations of method 200 may remain the same, but with an extra-layer of IPv4 communication over CAPWAP tunnels between the controller based APs and their corresponding WLCs. In turn, the WLCs may interface with the DS Lite Tunnels dedicated to the registered MNs via an IPv6 communication.

Nodes of the subscriber network 100 may comprise hardware and/or software elements capable of providing a seamless mobility handovers consistent with embodiments of the disclosure. For example, each MN, Gateway and AP associated with subscriber network 100 may be configured with a mobility handover application operative to perform method 200, or certain stages thereof.

Generally, consistent with embodiments of the disclosure, the mobility handover application may comprise program modules that may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The above referenced operational illustrations of methods, systems, and computer program products according to embodiments of the disclosure may describe functions/acts out of the order. Furthermore, while certain embodiments of the disclosure have been described, other embodiments may exist. Moreover, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM.

All rights including copyrights in the illustrations included herein are vested in and the property of the Applicant. The Applicant retains and reserves all rights in the illustrations included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   registering a Mobile Node (MN) for privileged network access via a first access point (AP) wherein registering the MN for privileged network access via the first AP comprises providing a MAC address of the MN to a first Mobility Access Gateway (MAG);
   establishing a privileged access channel for the MN via the first MAG, wherein a first AP serves as a termination point for the privileged access channel;
   detecting that the MN has switched from the first AP to a second AP;
   determining that the second AP is associated with the first MAG; and
   establishing the second AP as a new termination point for the privileged access channel in response to determining that the second AP is associated with the first MAG.

2. The method of claim 1, wherein establishing the privileged access channel for the MN via the first MAG comprises communicating the MAC address to a Local Mobile Anchor (LMA).

3. The method of claim 2, wherein establishing the privileged access channel for the MN via the first MAG further comprises assigning an IPv6 address to the MN.

4. The method of claim 3, further comprising establishing a Proxy Mobile IPv6 (PMIPv6) Tunnel between a Local Mobile Anchor (LMA) and the first MAG.

5. The method of claim 1, wherein establishing the privileged access channel for the MN comprises establishing a Dual Stack (DS) Lite Tunnel between the first AP and an LG NAT.

6. The method of claim 5, wherein establishing the DS Lite Tunnel between the first AP and the LG NAT comprises integrating a PMIPv6 Tunnel connecting a Local Mobility Anchor (LMA) with the first MAG.

7. The method of claim 4, wherein re-establishing the privileged access channel for the MN via the second MAG comprises retrieving the IPv6 address assigned to the MN.

8. The method of claim 7, wherein re-establishing the privileged access channel for the MN via the second MAG further comprises re-establishing the PMIPv6 Tunnel between the LMA and the second MAG.

9. The method of claim 8, wherein re-establishing the privileged access channel for the MN via the second MAG further comprises establishing a DS Lite Tunnel between the second AP and the LGNAT.

10. The method of claim 9, wherein establishing the DS Lite Tunnel between the second AP and the LGNAT comprises integrating the reestablished PMIPv6 Tunnel.

11. A system comprising:
    an access point (AP) connected to a Mobile Node (MN) wherein the AP is configured to assign an IPv4 address to the MN;
    a Mobility Access Gateway (MAG) connected to the AP;
    a Local Mobile Anchor (LMA) connected to the MAG;
    a Large-Scale Network Address Translator (LG NAT) connected to the LMA;
    a first communication protocol between the MN and the AP; and
    a second communication protocol between the AP and the LG NAT; and
    a communications tunnel facilitating communication between the MAG and the LMA.

12. The system of claim 11, wherein the LG NAT is configured to assign an IPv6 address to the MN.

13. The system of claim 12, wherein the AP is configured to communicate with the LG NAT via a Dual Stack (DS) Lite Tunnel.

14. The system of claim 13, wherein the communications tunnel comprises a PMIPv6 Tunnel within a path of the DS Lite Tunnel.

15. A method comprising:
 receiving a connection of a Mobile Node (MN) to a first access point (AP);
 assigning, by the first AP, a first address to the MN;
 establishing a primary Dual Stack (DS) Lite Tunnel from the first AP to a Large-Scale Network Address Translator (LG NAT);
 receiving an indication that the MN is to receive privileged network access;
 providing a MAC address of the MN to the LG NAT;
 receiving, from a Local Mobile Anchor (LMA), a second address for the MN;
 disassociating the first address from the MN;
 re-associating the second address with the MN; and
 establishing a dedicated DS Lite Tunnel from the first AP to the LG NAT.

16. The method of claim 15, wherein establishing the dedicated DS Lite Tunnel from the first AP to the LG NAT comprises establishing the dedicated DS Lite Tunnel via a first Mobility Access Gateway (MAG).

17. The method of claim 16, wherein establishing the dedicated DS Lite Tunnel via the first MAG comprises establishing a Proxy Mobile IPv6 (PMIPv6) Tunnel between the first MAG and the LMA.

18. The method of claim 17, further comprising, when the MN disconnects from the first AP and connects to a second AP:
 when the second AP is associated with the first MAG, setting the second AP to be a new termination point for the dedicated DS Lite Tunnel; and
 when the second AP is associated with a second MAG, re-establishing the dedicated DS Lite Tunnel from the second AP to the LG NAT via the second MAG.

\* \* \* \* \*